(12) United States Patent
Lee et al.

(10) Patent No.: US 10,492,097 B2
(45) Date of Patent: Nov. 26, 2019

(54) METHOD AND APPARATUS FOR CONTROLLING CONGESTION IN COMMUNICATION SYSTEM

(71) Applicants: Samsung Electronics Co., Ltd., Gyeonggi-do (KR); Ulsan National Institute of Science and Technology, Ulsan (KR)

(72) Inventors: Jin-Sung Lee, Seoul (KR); Kyunghan Lee, Ulsan (KR); Jung-Shin Park, Seoul (KR); Han-Na Lim, Seoul (KR); Joo-Hyung Lee, Bucheon-si (KR)

(73) Assignees: Samsung Electronics Co., Ltd., Suwon-si (KR); Ulsan National Institute of Science and Technology, Ulsan (KR)

( * ) Notice: Subject to any disclaimer, the term of this patent is extended or adjusted under 35 U.S.C. 154(b) by 7 days.

(21) Appl. No.: 15/547,470

(22) PCT Filed: Jan. 28, 2016

(86) PCT No.: PCT/KR2016/000934
§ 371 (c)(1),
(2) Date: Jul. 28, 2017

(87) PCT Pub. No.: WO2016/122225
PCT Pub. Date: Aug. 4, 2016

(65) Prior Publication Data
US 2018/0026898 A1 Jan. 25, 2018

(30) Foreign Application Priority Data
Jan. 28, 2015 (KR) .................... 10-2015-0013496

(51) Int. Cl.
*H04W 28/02* (2009.01)
*H04L 12/807* (2013.01)
(Continued)

(52) U.S. Cl.
CPC ....... *H04W 28/0273* (2013.01); *H04L 47/193* (2013.01); *H04L 47/25* (2013.01);
(Continued)

(58) Field of Classification Search
CPC ......... H04W 28/0273; H04W 28/0247; H04W 28/0284; H04W 28/0236; H04W 28/0289;
(Continued)

(56) References Cited

U.S. PATENT DOCUMENTS

| 7,424,546 B1 | 9/2008 | Aweya et al. |
| 7,693,052 B2 | 4/2010 | Jin et al. |

(Continued)

FOREIGN PATENT DOCUMENTS

| KR | 20080079410 A | 9/2008 |
| KR | 20130116294 A | 10/2013 |

OTHER PUBLICATIONS

Chen et al.; "An improved ARED Algorithm for Congestion Control of Network Transmission"; Mathematical Problems in Engineering; vol. 2010; Article ID 329035; Retrieved from the Internet: <URL:http://www.hindawi.com/journals/mpe/2010/329035/>; 15 pages.
(Continued)

*Primary Examiner* — Joshua Kading

(57) ABSTRACT

The present disclosure relates to a 5G or a pre-5G communication system for supporting a higher data transmission rate than a 4G communication system such as LTE. A method for controlling TCP congestion in a communication system provided in the present disclosure comprises the steps of: determining the maximum transmission rate of a network, while increasing the size of a congestion window at a predetermined time interval; determining a threshold transmission rate which is determined by a preset ratio with regard to the determined maximum transmission rate; and adjusting the size of the congestion window such that the
(Continued)

current transmission rate is not less than the threshold transmission rate and the delay time is no longer than the maximum allowable delay time.

18 Claims, 5 Drawing Sheets

(51) Int. Cl.
*H04L 12/801* (2013.01)
*H04L 12/825* (2013.01)
*H04L 12/841* (2013.01)

(52) U.S. Cl.
CPC ............ *H04L 47/27* (2013.01); *H04L 47/283* (2013.01); *H04W 28/0236* (2013.01); *H04W 28/0247* (2013.01); *H04W 28/0284* (2013.01); *H04W 28/0289* (2013.01)

(58) Field of Classification Search
CPC ....... H04L 47/27; H04L 47/283; H04L 47/25; H04L 47/193
See application file for complete search history.

(56) References Cited

U.S. PATENT DOCUMENTS

| | | | |
|---|---|---|---|
| 7,974,195 B2 | 7/2011 | Jin et al. | |
| 9,014,264 B1* | 4/2015 | Cheng | H04L 12/2647 |
| | | | 375/240.05 |
| 2008/0049632 A1 | 2/2008 | Ray et al. | |
| 2010/0238803 A1* | 9/2010 | Racz | H04L 47/10 |
| | | | 370/235 |
| 2013/0114408 A1* | 5/2013 | Sastry | H04W 28/02 |
| | | | 370/231 |
| 2015/0264098 A1* | 9/2015 | Dao | H04L 47/14 |
| | | | 709/231 |
| 2016/0294714 A1* | 10/2016 | Persson | H04L 47/12 |
| 2018/0159778 A1* | 6/2018 | Lee | H04L 47/193 |

OTHER PUBLICATIONS

Ha et al.; "CUBIC: A New TCP-Friendly High-Speed TCP Variant"; Proc. 3rd International Workshop on Protocols for Fast Long-Distance Networks (PFLDnet 2695); 21 pages.

* cited by examiner

METHOD AND APPARATUS FOR CONTROLLING CONGESTION IN COMMUNICATION SYSTEM

CROSS-REFERENCE TO RELATED APPLICATIONS AND CLAIM OF PRIORITY

The present application claims priority under 35 U.S.C. § 365 to International Patent Application No. PCT/KR2016/000934 filed Jan. 28, 2016, entitled "METHOD AND APPARATUS FOR CONTROLLING CONGESTION IN COMMUNICATION SYSTEM", and through Korean Patent Application No. 10-2015-0013496, which was filed on Jan. 28, 2015, each of which are incorporated herein by reference into the present disclosure as if fully set forth herein.

TECHNICAL FIELD

The present disclosure relates to a method and apparatus for controlling congestion of a transmission control protocol (TCP) in a communication system.

BACKGROUND

To satisfy demands for wireless data traffic having increased since commercialization of $4^{th}$-Generation (4G) communication systems, efforts have been made to develop improved $5^{th}$-Generation (5G) communication systems or pre-5G communication systems. For this reason, the 5G communication system or the pre-5G communication system is also called a beyond-4G-network communication system or a post-Long Term Evolution (LTE) system.

To achieve a high data rate, implementation of the 5G communication system in an ultra-high frequency (mm-Wave) band (e.g., a 60 GHz band) is under consideration. In the 5G communication system, beamforming, massive multi-input multi-output (MIMO), full dimensional MIMO (FD-MIMO), an array antenna, analog beamforming, and large-scale antenna technologies have been discussed to alleviate a propagation path loss and to increase a propagation distance in the ultra-high frequency band.

For system network improvement, in the 5G communication system, techniques such as an evolved small cell, an advanced small cell, a cloud radio access network (RAN), an ultra-dense network, a device to device (D2D) communication, a wireless backhaul, a moving network, cooperative communication, coordinated multi-points (CoMPs), and interference cancellation have been developed.

In the 5G system, advanced coding modulation (ACM) schemes including hybrid frequency-shift keying (FSK) and quadrature amplitude modulation (QAM) modulation (FQAM) and sliding window superposition coding (SWSC), and advanced access schemes including filter bank multi carrier (FBMC), non-orthogonal multiple access (NOMA), and sparse code multiple access (SCMA) have been developed.

In Open System Interconnection (OSI) 7 layer or Transmission Control Protocol/Internet Protocol (TCP/IP) 5 layer classification, a transport layer corresponding to Layer 4 may perform two functions.

First, in a multi-hop communication network including Internet, the transport layer adjusts the amount of data injected by a transmission node through the network, based on a state and/or a capability of a reception terminal, which is called a "flow control" function.

Second, the transport layer adjusts the amount of data injected by the transmission node through the network, based on a state and/or a capability of links of the network, which is called a "congestion control" function. The congestion control function guarantees fairness between multiple network flows using the network together.

A representative connection-oriented transport protocol in the transport layer is a TCP.

SUMMARY

Aspects of the present disclosure are to address at least the above-mentioned problems and/or disadvantages and to provide at least the advantages described below.

Existing TCP congestion control designs focus on maximizing a throughput in a maximum available bandwidth, without considering a delay time that is one of TCP congestion control performance indicators.

An aspect of the present disclosure provides a method and apparatus for controlling TCP congestion to guarantee high transmission rate and low delay time at the same time in a communication system.

An aspect of the present disclosure also provides a method and apparatus for controlling a congestion window size for TCP congestion control in a communication system.

An aspect of the present disclosure also provides a method and apparatus for controlling a congestion window size, taking into account a changing network state in a communication system.

An aspect of the present disclosure also provides a method and apparatus for determining whether a network state changes in a communication system.

Another aspect of the present disclosure also provides a method and apparatus for reflecting a reception congestion window size determined by a receiver into determination of a congestion window size of a transmitter in a communication system.

A method for controlling transmission control protocol (TCP) congestion in a communication system provided in the present disclosure includes determining a maximum transmission rate of a network while increasing a congestion window size every predetermined time unit, determining a threshold transmission rate to be a predetermined ratio of the determined maximum transmission rate, and adjusting the congestion window size such that a current transmission rate is greater than or equal to the threshold transmission rate and a delay time is less than or equal to a maximum allowable delay time.

An apparatus for controlling TCP congestion in a communication system provided in the present disclosure includes a transmission rate controller configured to determine a maximum transmission rate of a network while increasing a congestion window size every predetermined time unit and to determine a threshold transmission rate to be a predetermined ratio of the determined maximum transmission rate and a window controller configured to adjust the congestion window size such that a current transmission rate is greater than or equal to the threshold transmission rate and a delay time is less than or equal to a maximum allowable delay time.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
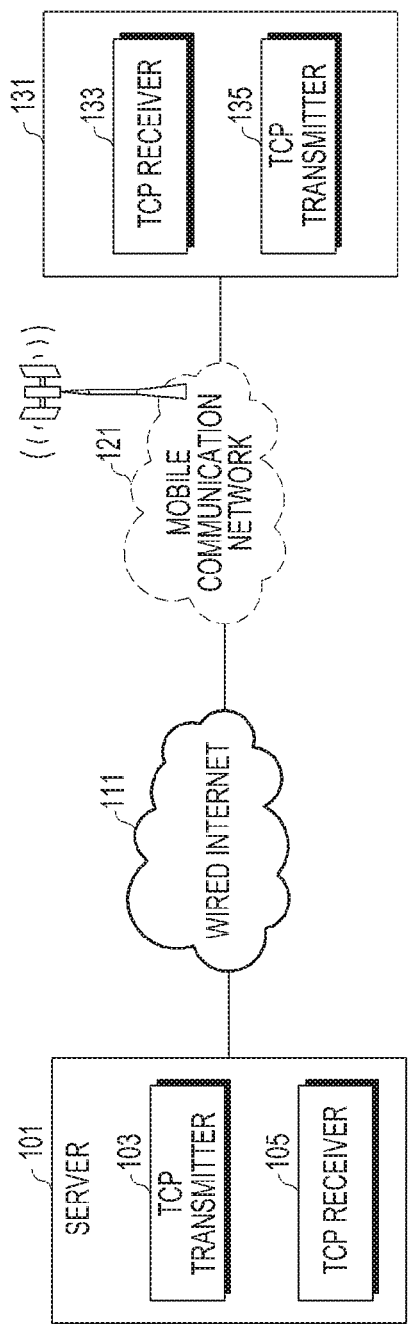
FIG. 1 is a block diagram of a communication system according to an embodiment of the present disclosure.

In the following description of the present disclosure, a detailed description of well-known functions or elements associated with the present disclosure will be omitted if it unnecessarily obscures the subject matter of the present disclosure. Hereinafter, embodiments of the present disclosure will be described with reference to the accompanying drawings.

The following embodiments of the present disclosure will be separately described for convenience, but at least two embodiments may be implemented in combination without colliding with each other.

Further, the terminologies to be described below are defined in consideration of functions in the embodiments of the present disclosure and may vary depending on a user's or operator's intention or practice. Therefore, the definitions should be made based on the contents throughout the entire description of the present disclosure.

Various changes may be made to embodiments of the present disclosure and the present disclosure may have various embodiments which will be described in detail with reference to the drawings. However, the embodiments according to the concept of the present disclosure are not construed as limited to specified disclosures, and include all changes, equivalents, or substitutes that do not depart from the spirit and technical scope of the present disclosure.

Although the terms such as "first" and "second" used in the various exemplary embodiments of the present disclosure may modify various elements of the various exemplary embodiments, these terms do not limit the corresponding elements. These terms may be used for the purpose of distinguishing one element from another element. For example, a first element may be named as a second element without departing from the right scope of the various exemplary embodiments of the present disclosure, and similarly, a second element may be named as a first element. The term "and/or" includes a combination of a plurality of related provided items or any one of the plurality of related provided items.

The terms used in the specification are for the purpose of describing particular exemplary embodiments only and are not intended to be limiting. The singular forms are intended to include the plural forms as well, unless the context clearly indicates otherwise. The term "include" or "has" used in the exemplary embodiments of the present disclosure is to indicate the presence of features, numbers, steps, operations, elements, parts, or a combination thereof described in the specifications, and does not preclude the presence or addition of one or more other features, numbers, steps, operations, elements, parts, or a combination thereof.

All of the terms used herein including technical or scientific terms have the same meanings as those generally understood by an ordinary skilled person in the related art unless they are defined other. The terms defined in a generally used dictionary should be interpreted as having the same meanings as the contextual meanings of the relevant technology and should not be interpreted as having ideal or exaggerated meanings unless they are clearly defined in the various exemplary embodiments.

Hereinafter, various embodiments of the present disclosure will be described in detail with reference to the accompanying drawings. The same elements will be designated by the same reference numerals although they are shown in different drawings. Further, a detailed description of a known function and configuration which may make the subject matter of the present disclosure unclear will be omitted. In the following description, only parts necessary for understanding of operations according to embodiments of the present disclosure will be described and other parts will not be described not to obscure the subject matter of the present disclosure.

An apparatus and method proposed in the present disclosure are applicable to various communication systems such as a Long-Term Evolution (LTE) mobile communication system, an LTE-Advanced (LTE-A) mobile communication system, a high speed downlink packet access (HSDPA) mobile communication system, a high speed uplink packet access (HSUPA) mobile communication system, a high rate packet data (HRPD) mobile communication system of the 3GPP2, a wideband code division multiple access (WCDMA) mobile communication system of the 3GPP2, a code division multiple access (CDMA) mobile communication system of the 3GPP2, the Institute of Electrical and Electronics Engineers (IEEE) 802.16m communication system, an evolved packet system (EPS), a mobile Internet Protocol (IP) system, and so forth.

Before the present disclosure is described in detail, the operating principle of TCP congestion control will be described in brief.

TCP basically performs congestion control by maintaining the size of a congestion window close to a maximum available bandwidth. The "congestion window size" determines the amount of data transmitted in single data transmission. In TCP congestion control, data is transmitted while maintaining a congestion window size closest to a current maximum available bandwidth of a network, allowing data to be efficiently transmitted in a non-congested network state. To this end, a maximum available bandwidth of a network is rapidly found out in TCP congestion control designing, and the congestion window size is maintained closely to the found maximum available bandwidth. For this end, in most TCP congestion control, once transmission control starts, the amount of packets of data injected to a network aggressively increases to quickly find out a maximum available bandwidth.

The aforementioned concept of TCP congestion control will be described below by taking a brief example. However, the following example is merely intended to describe the concept of TCP congestion control, and various congestion control schemes as well as the example will be used.

In TCP congestion control, upon start of transmission control for transmitting a data packet, a maximum available bandwidth is found out while increasing the amount of data packets injected to the network.

For example, in $1^{st}$ transmission, a congestion window size is set to 1 and one packet is transmitted according to the set congestion window size, and an acknowledgement (ACK) is waited. If the ACK is received for the $1^{st}$ transmission, the congestion window size is set to be double the previous congestion window size, that is, to 2 in $2^{nd}$ transmission. In this case, a threshold value is set to 1. For reference, the threshold value is a value for reducing the congestion window size in case of a failure to receive the ACK. If the ACK is received for the 1st transmission, two packets are transmitted and the ACK is waited in the $2^{nd}$ transmission. If the ACK is received for the $2^{nd}$ transmission, the congestion window size is set to be double the previous congestion window size, that is, to 4 and the threshold value is set to 2 in $3^{rd}$ transmission. Thus, in the $3^{rd}$ transmission, four packets are transmitted according to the congestion window size being set to 4, and the ACK is waited. If the ACK is received for the $3^{rd}$ transmission, the congestion window size is set to be double the previous congestion window size, that is, to 8 and the threshold value is set to 4 in $4^{th}$ transmission.

In this way, the congestion window size is increased, and in $N^{th}$ transmission, the congestion window size is set to 1024 and the threshold value is set to 512, such that 1024 packets are transmitted for 1024 congestion window sizes; in case of a failure to receive the ACK for the $N^{th}$ transmission, in $(N+1)^{th}$ transmission, the congestion window size is set to 512 that is the threshold value being set in the $N^{th}$ transmission.

Thereafter, if 512 packets are transmitted in $(N+2)^{th}$ transmission and the ACK is received for the $(N+2)^{th}$ transmission, the congestion window size of $(N+3)^{th}$ transmission is not double the congestion window size of the $(N+2)^{th}$ transmission, but is 513 increased by a predetermined value (e.g., 1); in $(N+4)^{th}$ transmission, 513 packets are transmitted.

In this example, since the ACK fails to be received first for the $N^{th}$ transmission for which the congestion window size is set to 1024, the network is determined to be in the "congested state", 1024 is determined to be the current "maximum available bandwidth" of the network, and the above-described congestion control is performed for subsequent transmissions.

For reference, a "congested state of a network" means "deterioration of the entire network performance in case of injection of an additional packet to the network". In addition, a "maximum available bandwidth of a network" means "a maximum value of a proper amount of packets that may be injected to the network". Once the maximum available bandwidth of the network is determined, a "maximum transmission rate or throughput" of data over the current network may be determined accordingly.

Thus, when the amount of packets injected to a network increases in the network, if "the network enters the congested state", it may be determined that "the maximum available bandwidth of the network is reached", and a "maximum throughput" in the network is determined according to the maximum available bandwidth. Thereafter, generally, the congestion window size is adjusted based on the maximum transmission rate to perform TCP congestion control. Thus, in TCP congestion control, whether the network is in the congested state needs to be determined first.

Meanwhile, a scheme for determining whether the network is in the congested state may roughly include a "loss-based" TCP scheme and a "delay-based" TCP scheme. Most TCP congestion control is performed using loss-based TCP. The loss-based TCP congestion control determines network congestion based on a packet drop or loss, and the delay-based TCP congestion control determines network congestion based on the amount of increase of a current delay time for an initial round-trip delay time or round-trip time (RTT).

The loss-based TCP congestion control may accurately find out the maximum available bandwidth. However, the loss-based TCP congestion control may continuously cause a loss to find out the maximum available bandwidth. In addition, like a packet drop caused by a radio channel, if a cause for a loss is not queueing that occurs due to the excessive amount of injected packets relative to a network bandwidth, the loss-based TCP congestion control fails in finding the maximum available bandwidth. However, if a radio channel in a recent mobile communication network fails in packet transmission, the transmission is repeatedly recovered in a medium access control (MAC) layer, and a packet drop occurring in the radio channel is hidden by setting a modulation and coding scheme (MCS) level less aggressively than a channel state, etc., to prevent a TCP transmission/reception end from sensing the packet drop occurring in the radio channel, such that application of the loss-based TCP to the latest wireless environment substantially does not cause a big problem.

The delay-based TCP congestion control performs congestion control according to an increase in a delay time prior to occurrence of a direct packet drop in a network, by which the packet drop may be prevented and the delay time may be maintained at a proper level. On the other hand, the delay-based TCP congestion control may have a weak point in rapidly finding a maximum available bandwidth due to low aggression, and if an initial delay time, which is a criterion for an algorithm operation, becomes meaningless due to a sudden change in a network condition, the delay-based TCP congestion control may fail in finding the maximum available bandwidth.

Before TCP congestion control according to the present disclosure is described, the basic concept of the present disclosure will be described in brief.

The basic concept of TCP congestion control proposed in the present disclosure includes determining a current maximum transmission rate of a network while increasing a TCP congestion window size, and setting the congestion window size while adjusting the congestion window size corresponding to the determined maximum transmission rate to maintain a threshold transmission rate being equal to or greater than a predetermined ratio (e.g., 95%) of the maximum transmission rate. In this way, the delay time does not increase greatly in terms of delay time performance while maintaining a transmission rate greater than or equal to the threshold transmission rate close to the maximum transmission rate in terms of transmission rate performance, such that excellent performance may be maintained in a transmission rate performance indicator and a delay time performance indicator in TCP congestion control.

Hereinbelow, an embodiment of the present disclosure will be described in detail.

FIG. 1 is a block diagram of a communication system according to an embodiment of the present disclosure.

Referring to FIG. 1, the communication system may include a server 101 and a terminal 131, and the server 101 may include a TCP transmitter 103 and a TCP receiver 105. The terminal 131 may include a TCP transmitter 135 and a TCP receiver 133. In the communication system of FIG. 1, in a state where the server 101 is connected to wired Internet 111 and the terminal 131 is connected to wireless Internet 121 through a base station 123, the server 101 and the terminal 131 communicate with each other. However, this is merely an example, and the TCP congestion control scheme according to the present disclosure is applicable to a wired communication or wireless communication system.

In FIG. 1, each of the server 101 and the terminal 131 may transmit data to its counterpart entity, and the TCP transmitters 103 and 135 perform TCP congestion control proposed in the present disclosure in data transmission.

Hereinbelow, a method for controlling TCP congestion according to the present disclosure will be described.

TCP congestion control according to the present disclosure updates a maximum transmission rate every time unit i using Equation 1, while increasing the congestion window size every time unit i. Herein, the time unit i may be an RTT.

$$Tput\_max(i)=max(Tput\_max(i-1), Tput\_current(i)) \quad [\text{Equation 1}]$$

Equation 1 means that the greater value between a transmission rate Tput_current(i) at a current point in time and a maximum transmission rate Tput_max(i−1) until a previous point in time is determined as a maximum transmission rate Tput_max(i) at an $i^{th}$ point in time. For reference, various schemes may be selected to increase the congestion window size every time unit. For example, the congestion window size may be set to be double the current congestion window size every time unit. This is expressed as below.

$$CWND(i)=CWND(i-1)*2 \quad [\text{Equation 2}]$$

If the maximum transmission rate determined using Equation 1 does not increase for a predetermined time (e.g., 3*RTT) or if the measured RTT is greater than or equal to a predetermined ratio (e.g., 130%) of a minimum RTT, a threshold transmission rate Tput_threshold corresponding to a predetermined ratio X % of the maximum transmission rate is set using Equation 3. The predetermined ratio X % of the maximum transmission rate is typically set to a value greater than or equal to 90%, but may also be set equal to or greater than 95% according to a state of a network or transmission/reception entities. When the threshold transmission rate is set, the threshold transmission rate may be determined considering a delay time such that the delay time is not greater than or equal to a maximum delay time supported by a system. This is intended to satisfy both transmission rate performance and delay time performance while performing TCP congestion control.

$$Tput\_threshold(i)=Tput\_max(i)*X/100 \quad [\text{Equation 3}]$$

After the threshold transmission rate Tput_threshold is set using Equation 3, the congestion window size is adjusted based on the set threshold transmission rate. The congestion window size may be adjusted using various schemes, for example, a proportional-integral (PI) scheme. Equation 4 expresses a scheme to adjust the congestion window size using the PI scheme.

$$CWND(i)=CWND(i-1)+G*(E(i)+intE(i)), (E(i)+intE(i))<=0$$

$$CWND(i)=CWND(i-1)+2*G*(E(i)+intE(i)), (E(i)+intE(i))>0$$

$$E(i)=1-Tput\_current/Tput\_threshold$$

$$intE(i)=(1-\lambda)*intE(i-1)+\lambda*E(i) \quad [\text{Equation 4}]$$

E(i) is a value calculated by subtracting (current transmission rate/threshold transmission rate) from 1.

intE(i) is a value calculated by multiplying values E(i−1) for previous points in time and a value E(i) for a current point in time by a weight value and summing the multiplication results. This is intended to briefly calculate an integral value of E(i). Thus, intE(i) may be calculated as an integral value of E(i).

G is a control constant of a congestion window size, and may be set considering a network state, etc., and may be typically set to "50".

λ is a weight constant in a moving average and is typically set to a value close to ⅛. This is intended to substitute for an integral equation difficult to calculate in kernel.

Referring to the first item of Equation 4, if a value of <E(i)+intE(i)> is 0 or negative, a congestion window size at a current point in time, CWND(i), is calculated by adding a product of <E(i)+intE(i)> and the control constant G (G>0) to a congestion window size at a previous point in time, CWND(i−1). This equation is intended to reduce the congestion window size at the current point in time when compared to the congestion window size at the previous point in time.

For example, let a maximum transmission rate be set to 110 and a threshold transmission rate be set to 100.

If the current transmission rate is 100 at i=1, then E(1)=(1−100/100)=0 and intE(1)=0. Hence, <E(1)+intE(1)> is equal to 0, such that the first part of Equation 4 is applied and CWND(1)=CWND(0)+G*(0+0)=CWND(0). As a result, the congestion window size at i=1 is equal to the congestion window size at i=0.

If the current transmission rate at i=2 is 105 and λ is ⅛, then E(2)=(1−105/100)=−0.05 and intE(2)=(1−⅛)*E(1)+⅛*E(2)=0+(⅛*(−0.05))=−0.05/8. Hence, <E(2)+intE(2)> is negative, such that the first part of Equation 4 is applied and CWND(2)=CWND(1)+G*(−0.05)<CWND(1). As a result, the congestion window size at i=2 is less than the congestion window size at i=1.

That is, the first part of Equation 4 corresponds to a process of reducing the congestion window size. This is intended to make the current transmission rate be close to the threshold transmission rate by reducing the congestion window size if the current transmission rate is greater than the threshold transmission rate. However, it should be noted that application of the first part is not necessarily limited to a case where the current transmission rate is greater than the threshold transmission rate, and depending on circumstances, the application is possible when <E(i)+intE(i)> is 0 or negative even if the current transmission rate is less than the threshold transmission rate.

In contrast to the first part, the second part of Equation 4 corresponds to a process of increasing the congestion window size. This is intended to make the current transmission rate be close to the threshold transmission rate by increasing the congestion window size if the current transmission rate is less than the threshold transmission rate. However, it should be noted that application of the second part is not necessarily limited to a case where the current transmission rate is less than the threshold transmission rate, and depending on circumstances, the application is possible when <E(i)+intE(i)> is positive even if the current transmission rate is less than the threshold transmission rate.

Meanwhile, unlike in the first part of Equation 4 where <E(i)+intE(i)> is multiplied by G, in the second part, <E(i)+intE(i)> is multiplied by 2G. That is, the congestion window size is reduced by G times of <E(i)+intE(i)>, whereas the congestion window size is increased by 2G times of <E(i)+intE(i)>. As such, by setting an increase rate greater than a reduction rate to adjust the congestion window size, the current transmission rate may be increased at a greater rate when the current transmission rate is less than the threshold transmission rate, thereby stably guaranteeing a transmission rate. While "2" is multiplied to G in the second part of Equation 4, this is merely an example and a constant multiplied to G may obviously vary with system settings or configuration.

By adjusting the congestion window size according to Equation 2 through Equation 4, a transmission rate between the threshold transmission rate and the maximum transmission rate is supported stably, such that the delay time does not increase over a maximum allowable delay time.

As another scheme to adjust the congestion window size, a proportional (P) scheme based on Equation 5 may be used.

$$CWND(i)=CWND(i-1)+G*E(i), E(i)<=0$$

$$CWND(i)=CWND(i-1)+2*G*E(i), E(i)>0 \qquad \text{[Equation 5]}$$

Comparing Equation 5 with Equation 4, the congestion window size is determined including intE(i) in Equation 4, whereas in Equation 5, the P scheme determines the congestion window size using E(i) without including intE(i). The scheme for adjusting the congestion window size described in Equation 4 is applicable to the scheme described in Equation 5.

Meanwhile, when TCP congestion control is performed while setting the maximum transmission rate and the threshold transmission rate and adjusting the congestion window size accordingly, a network state may change. In the present disclosure, if a network state changes during TCP congestion control, the already set maximum transmission rate and/or threshold transmission rate may be reset to reflect the changing network state.

Whether the network state changes may be determined by comparing the current transmission rate with the threshold transmission rate.

In a first example, if the current transmission rate is maintained as being greater than the already set threshold transmission rate for a predetermined time (e.g., 3*RTT), then it may be determined that the network state is improved; if the current transmission rate is maintained as being less than the already set threshold transmission rate for a predetermined time (e.g., 3*RTT), then it may be determined that the network state is deteriorated.

In another example, if the current transmission rate is maintained as being greater than a predetermined ratio (e.g., 5%) of the already set threshold transmission rate for a predetermined time, then it may be determined that the network state is improved; if the current transmission rate is maintained as being less than a predetermined ratio (e.g., 5%) of the already set threshold transmission rate for a predetermined time, then it may be determined that the network state is deteriorated. In this case, whether the network state changes may be determined based on a shorter time (e.g., 2*RTT) than in the first example.

If it is determined that the network state is improved according to the aforementioned criterion, then the maximum transmission rate and the threshold transmission rate may be reset, reflecting the changing network state based on Equation 1 and Equation 3, and the congestion window size may be re-adjusted using Equation 5 correspondingly.

Meanwhile, if it is determined that the network state is deteriorated according to the aforementioned criterion, then the threshold transmission rate may be reset to the current transmission rate using Equation 6.

$$Tput\_threshold(i)=Tput\_current(i) \qquad \text{[Equation 6]}$$

The maximum transmission rate may be reset according to Equation 7.

$$Tput\_max(i)=Tput\_threshold(i)*100/X \qquad \text{[Equation 7]}$$

X is the threshold transmission rate set in Equation 3, and may vary according to settings, as described above.

Once the threshold transmission rate and the maximum transmission rate are reset using Equation 6 and Equation 7, reflecting the deteriorated network state, then congestion control is performed while adjusting the congestion window size using Equation 4 or Equation 5.

Figure 2:
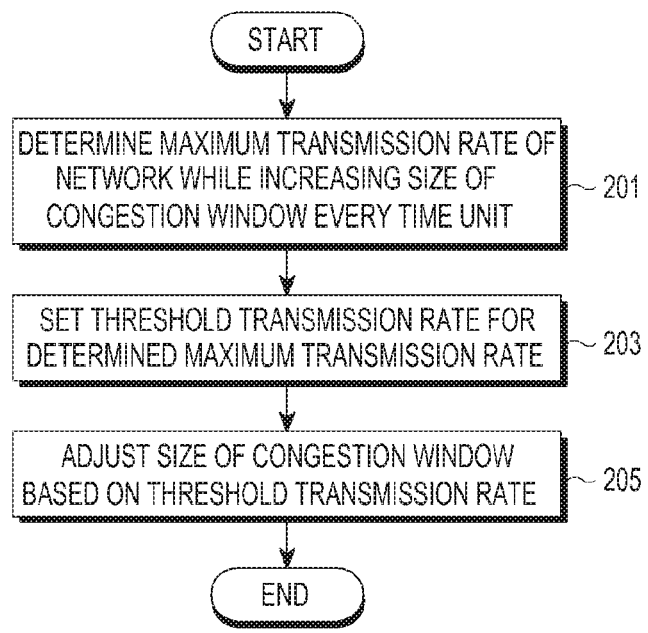
FIG. 2 is a flowchart illustrating a method for controlling TCP congestion according to the present disclosure.

FIG. 2 is a flowchart illustrating a method for controlling TCP congestion according to the present disclosure. Operations are performed by a TCP transmitter of a server or a terminal.

In operation 201, the TCP transmitter determines the current maximum transmission rate of the network while increasing the congestion window size every time unit i, for example, every RTT. A detailed determination scheme is as described in Equation 1.

In operation 203, the TCP transmitter sets a predetermined threshold transmission rate for the determined maximum transmission rate. When the threshold transmission rate is set, a delay time is considered. That is, the threshold transmission rate is set such that the delay time does not exceed a maximum delay time set in a system. A detailed setting scheme is as described in Equation 3.

In operation 205, the TCP transmitter performs TCP congestion control while adjusting the congestion window size based on the set threshold transmission rate. That is, the congestion window size is adjusted such that the current transmission rate changes between the threshold transmission rate and the maximum transmission rate. In this way, since the threshold transmission rate is set considering the delay time, the transmission rate is greater than or equal to the threshold transmission rate and the congestion window size is adjusted such that the delay time is maintained as being less than the maximum delay time, whereby TCP congestion may be controlled considering both the transmission rate performance and the delay time performance. A detailed adjustment scheme is as described in Equation 4 or Equation 5.

However, if a network environment changes during TCP congestion control described with reference to FIG. 2, the maximum transmission rate and/or threshold transmission rate may be reset reflecting the change, as described above.

Figure 3:
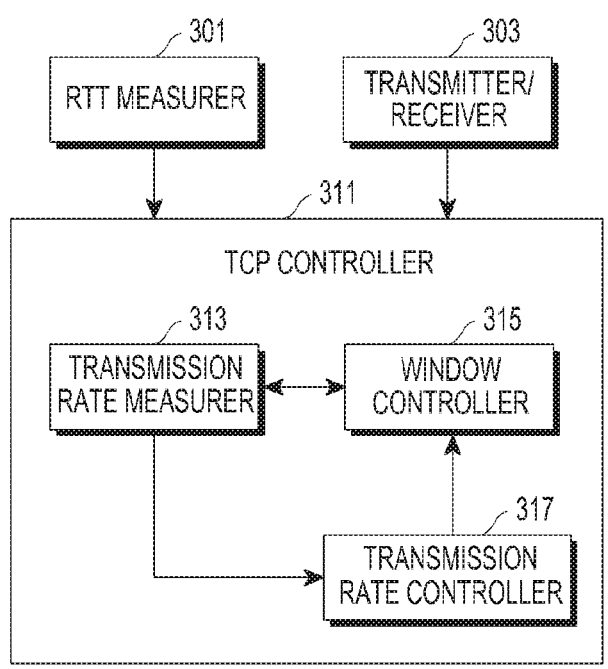
FIG. 3 is a block diagram of a TCP transmitter that performs TCP congestion control according to an embodiment of the present disclosure.

FIG. 3 is a block diagram of a TCP transmitter that performs TCP congestion control according to an embodiment of the present disclosure.

The TCP transmitter according to the present disclosure may include an RTT measurer 301, a transmitter/receiver 303, and a TCP controller 311. The TCP controller 311 may include a transmission rate measurer 313, a window controller 315, a transmission rate controller 317, and a gain controller 319.

The RTT measurer 301 measures an RTT necessary for TCP congestion control and delivers the measured RTT information to the TCP controller 311.

The transmitter/receiver 303 performs data transmission and reception according to TCP congestion control. In particular, the transmitter/receiver 303 receives ACK/duplicate ACK (DUPACK) information from a counterpart entity and delivers the same to the TCP controller 311. In the TCP, a NACK function is performed using DUPACK.

The transmission rate measurer 313 in the TCP controller 311 measures a transmission rate every time unit during TCP congestion control, and delivers the measured transmission rate information to the transmission rate controller 317.

The transmission rate controller 317 determines the maximum transmission rate as described in Equation 1 based on the delivered current transmission rate. When determining the maximum transmission rate, the transmission rate controller 317 uses ACK/DUPACK information delivered from the transmitter/receiver 303. That is, if failing to receive the ACK or to receive the DUPACK, the transmission rate controller 317 recognizes occurrence of a data loss, determines a point in time when the data loss occurs as a point in time when the network enters a congested state, and determines a transmission rate at that point in time as the maximum transmission rate. The transmission rate controller 317 also determines a threshold transmission rate based on the determined maximum transmission rate as described in Equation 3. When determining the threshold transmission rate, the transmission rate controller 317 considers delay time information delivered from the RTT measurer 301. That is, the transmission rate controller 317 determines the threshold transmission rate such that the delay time information is less than a maximum delay time set in the system. The transmission rate controller 317 delivers information of the determined threshold transmission rate and information of the current transmission rate to the window controller 315. The transmission rate controller 317 resets the maximum transmission rate and the threshold transmission rate, reflecting a change in a network state. A detailed description thereof has been already provided above.

The window controller 315 increases a congestion window size every predetermined time to allow the transmission rate controller 317 to determine the maximum transmission rate. The window controller 315 also adjusts the congestion window size as described in Equation 4 or Equation 5 by using the threshold transmission rate information and the current transmission rate information delivered from the transmission rate controller 317.

Figure 4A:
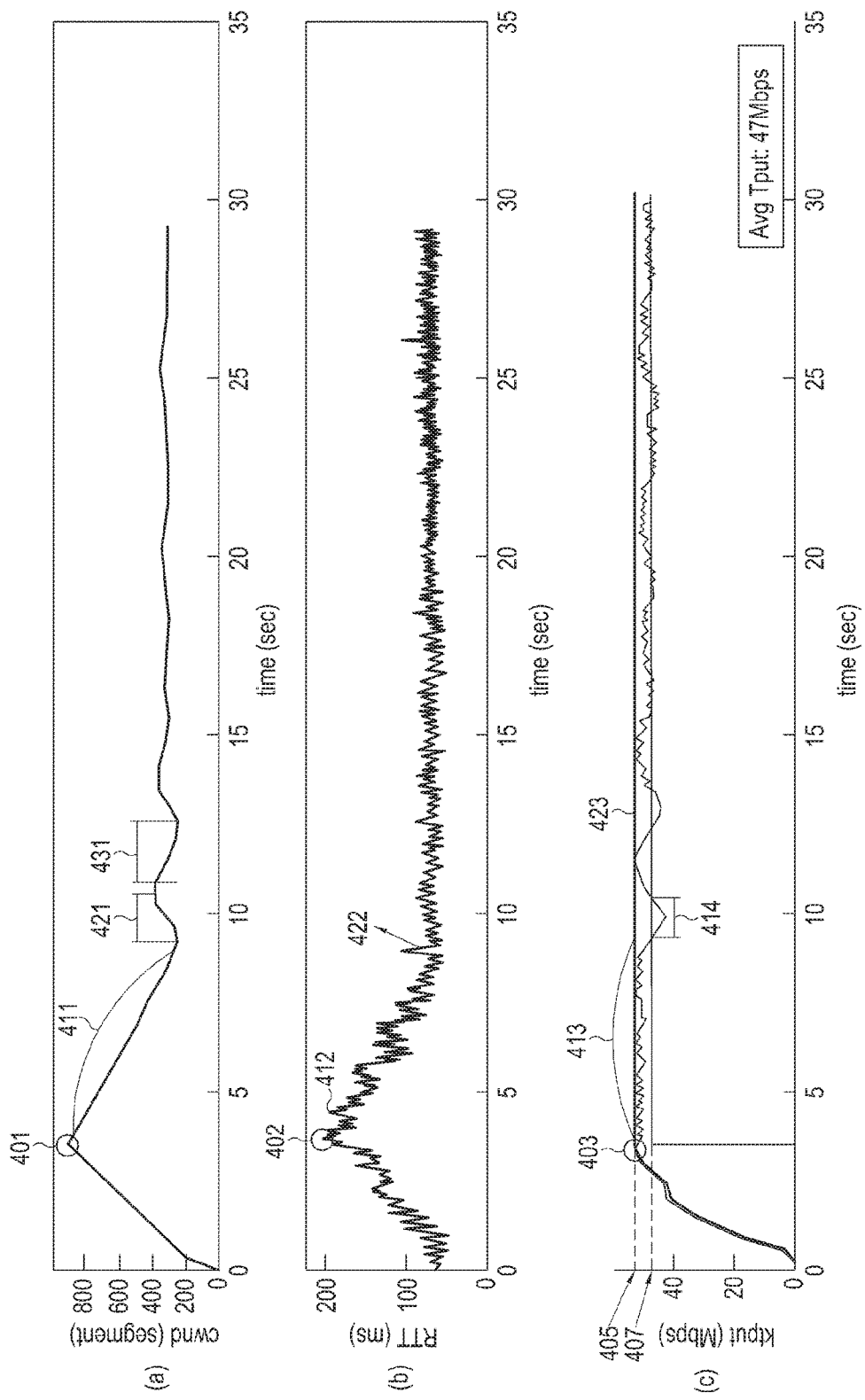
FIG. 4A is a view for describing a maximum transmission rate, a threshold transmission rate, a current transmission rate, and a delay time with respect to a change of a congestion window size when a maximum transmission rate does not increase for a predetermined time by TCP congestion control according to an embodiment of the present disclosure.

FIG. 4A is a view for describing a maximum transmission rate, a threshold transmission rate, a current transmission rate, and a delay time with respect to a change of a congestion window size when a maximum transmission rate does not increase for a predetermined time by TCP congestion control according to an embodiment of the present disclosure.

(a) shows a state where a congestion window size changes, (b) shows an RTT with respect to a change of the congestion window size, and (c) shows a change of a maximum transmission rate, a change of a threshold transmission rate, and a change of a current transmission rate with respect to a change of the congestion window size.

First, in (a), the congestion window size increases until reference numeral 401. Thus, in (b), an RTT increases as indicated by reference numeral 402. Also, in (c), a transmission rate increases as indicated by reference numeral 403. Assuming occurrence of a packet drop as indicated by 401, a transmission rate at that point in time may be determined as a maximum transmission rate. This is indicated by reference numeral 405. After the maximum transmission rate is determined, a threshold transmission rate is determined to be a predetermined ratio of the maximum transmission rate. The threshold transmission rate is indicated by reference numeral 407.

Once the maximum transmission rate 405 and the threshold transmission rate 407 are determined in this way, the congestion window size is reduced in (a). However, the congestion window size is reduced such that the current transmission rate is not less than the threshold transmission rate and a delay time is less than a predetermined maximum delay time. This is indicated by reference numeral 411. That is, in reference numeral 411, the congestion window size is reduced, but the current transmission rate is not less than the threshold transmission rate. Although the congestion window size is reduced in a period 411, the current transmission rate is maintained as being greater than or equal to the threshold transmission rate in a period 413.

However, in a period 414, the current transmission rate is less than the threshold transmission rate. In this case, the congestion window size needs to be increased again such that the current transmission rate is greater than or equal to the threshold transmission rate 407. Thus, the congestion window size is increased in a period 421.

In a period 423, as the congestion window size is increased in the period 421, the current transmission rate is close to the maximum transmission rate 405. Thus, in a period following the period 421, the congestion window size is reduced again.

Meanwhile, in terms of a delay time, in (b), after a point in time 422, the RTT is maintained in a predetermined range. This is because the threshold transmission rate is set considering the delay time as described above.

Figure 4B:
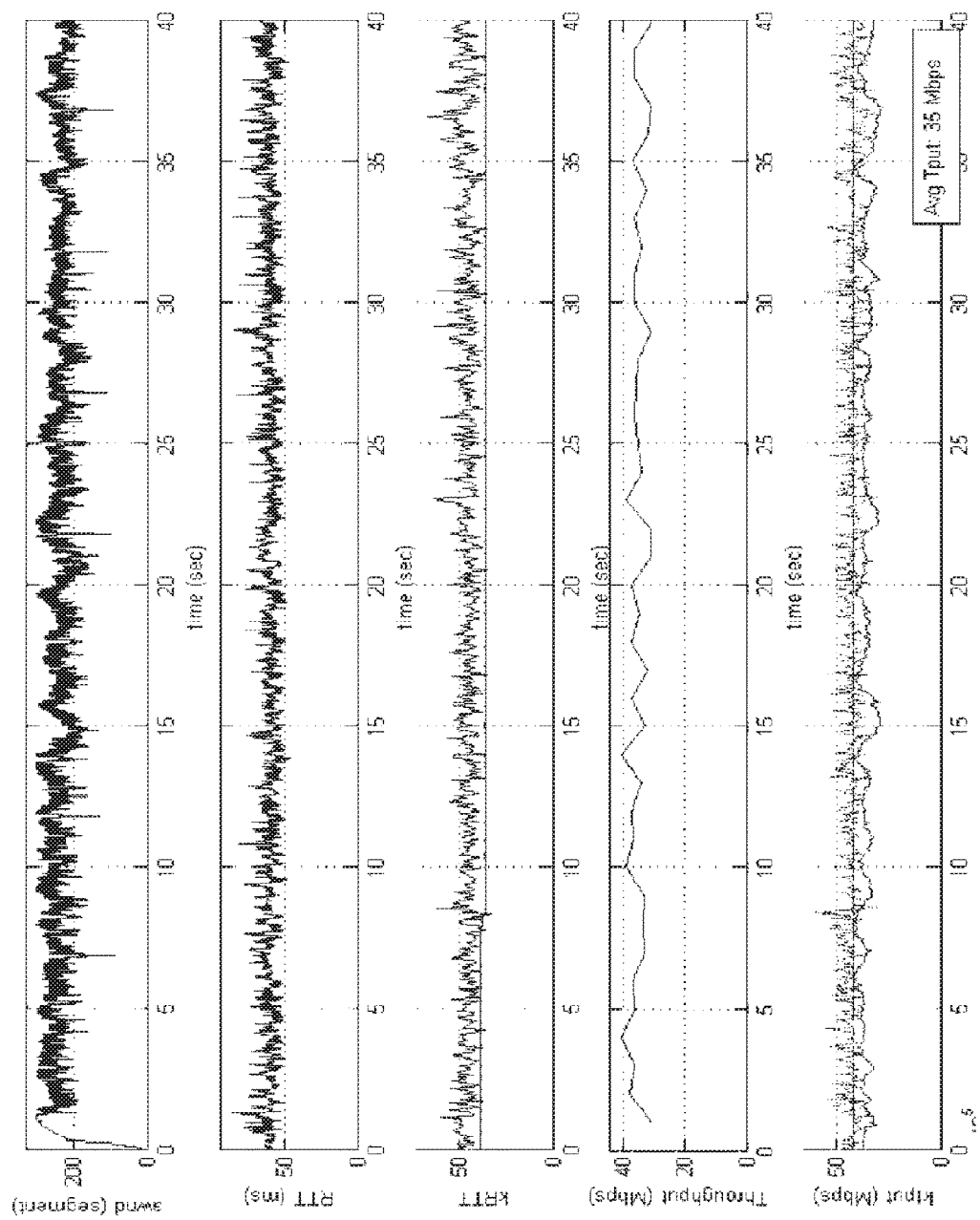
FIG. 4B is a view for describing a maximum transmission rate, a threshold transmission rate, a current transmission rate, and a delay time with respect to a change of a congestion window size when a measured RTT is equal to a predetermined ratio of a minimum RTT by TCP congestion control according to an embodiment of the present disclosure.

FIG. 4B is a view for describing a maximum transmission rate, a threshold transmission rate, a current transmission rate, and a delay time with respect to a change of a congestion window size when a measured RTT is equal to a predetermined ratio of a minimum RTT by TCP congestion control according to an embodiment of the present disclosure.

When compared to FIG. 4A, a point in time when the threshold transmission rate Tput_threshold is set may be advanced. Thus, a peak is formed near 4 seconds in FIG. 4A, whereas that peak is removed in FIG. 4B.

So far, TCP congestion control that may be performed in the TCP transmitter of the terminal or the server has been described.

Possible modified embodiments will be described in brief based on the above-described embodiments.

When the terminal or the server operates as a transmitter, a congestion control scheme of the TCP transmitter may be used as described above. However, when the terminal or the server operates as a receiver, a maximum transmission rate and a threshold transmission rate of the receiver are determined and a congestion window size of the receiver adjusted based on the determined rates is determined as described above, and the determined congestion window size is provided to a counterpart, a transmitter. Then, the transmitter may determine a final congestion window size by using congestion window size information received from the receiver and congestion window size information of the transmitter determined as described above. Such operations may be additionally performed by the transmission rate controller 317 and the window controller 315 of FIG. 3.

Particular aspects of the present disclosure may be implemented with a computer-readable code on a computer-readable recording medium. The computer readable recording medium may be any type of data storage device that may store data readable by a computer system. Examples of record-mediums readable by the computer may include a read-only memory (ROM), a random-access memory (RAM), compact disk ROM (CD-ROM), magnetic tapes, floppy disks, optical data storage devices, carrier waves (such as data transmission through the Internet). The computer readable recording medium may be distributed through computer systems connected over a network, and thus the computer readable code is stored and executed in a decentralized manner. Further, functional programs, codes and code segments for achieving the present disclosure may be easily interpreted by programmers skilled in the art which the present disclosure pertains to.

The apparatus and method according to an embodiment of the present disclosure may be implemented by hardware, software, or a combination of hardware and software. Such arbitrary software may be stored, for example, in a volatile or non-volatile storage device (e.g., a read only memory (ROM), etc.), a memory (e.g., a random access memory (RAM), a memory chip, a memory device, or a memory integrated circuit (IC)), or a machine (e.g., computer) recordable optical or magnetic storage medium (e.g., a compact disk (CD), a digital versatile disk (DVD), a magnetic disc, a magnetic tape, etc.) regardless of its ability to erase or rewrite. It can be seen that the method according to the present disclosure may be implemented by a computer or a portable terminal which includes a controller and a memory, and the memory is an example of a machine-readable storage medium which is suitable for storing a program or programs including instructions for implementing the embodiment of the present disclosure.

Therefore, the present disclosure includes a program including codes for implementing an apparatus or method claimed in an arbitrary claim and a machine(computer)-readable storage medium for storing such a program. The program may be electronically transferred through an arbitrary medium such as a communication signal delivered through a wired or wireless connection, and the present disclosure properly includes equivalents thereof.

The apparatus according to an embodiment of the present disclosure may receive and store the program from a program providing device connected in a wired or wireless manner. The program providing device may include a memory for storing a program including instructions for instructing the apparatus to execute a preset method, information necessary for the method, a communication unit for performing wired or wireless communication with the apparatus, and a controller for transmitting a corresponding program to the apparatus at the request of the apparatus or automatically.

The invention claimed is:

1. A method for controlling transmission control protocol (TCP) congestion in a communication system, the method comprising:
   determining a maximum transmission rate of a network while increasing a congestion window size every predetermined time unit;
   determining a threshold transmission rate such that a ratio of the threshold transmission rate to the determined maximum transmission rate is set to a predetermined value; and
   adjusting the congestion window size such that a current transmission rate is greater than or equal to the threshold transmission rate and a delay time is less than or equal to a maximum allowable delay time,
   wherein the delay time is based on a round trip time (RTT) for a packet, and
   wherein the maximum transmission rate is determined to be a greater value between a transmission rate at a current point in time and a transmission rate until a previous point in time.

2. The method of claim 1, wherein the threshold transmission rate is set considering the delay time.

3. The method of claim 1, wherein the adjusting of the congestion window size comprises:
   increasing the congestion window size from a previous congestion window size, if a value $<E(i)+intE(i)>$ is positive; and
   reducing the congestion window size from the previous congestion window size, if the value $<E(i)+intE(i)>$ is not positive,
   wherein $E(i)$ is $1-$(current transmission rate/threshold transmission rate) at a point in time i,
   wherein $intE(i)$ is an integral value of $E(i)$ or $(1-\lambda)*intE(i-1)+\lambda*E(i)$, and
   wherein $\lambda$, is a moving average weight value,
   wherein a rate for increasing the congestion window size when the value $<E(i)+intE(i)>$ is positive is set greater than a rate for reducing the congestion window size when the value $<E(i)+intE(i)>$ is not positive.

4. The method of claim 1, wherein the adjusting of the congestion window size comprises:
   increasing the congestion window size from a previous congestion window size, if $E(i)$ is positive; and
   reducing the congestion window size from the previous congestion window size, if $E(i)$ is not positive,
   wherein $E(i)$ is $1-$(current transmission rate/threshold transmission rate) at a point in time i.

5. The method of claim 4, wherein a rate for increasing the congestion window size when $E(i)$ is positive is set greater than a rate for reducing the congestion window size when $E(i)$ is not positive.

6. The method of claim 1, further comprising, in response to a change in a state of a network, determining at least one of the maximum transmission rate and the threshold transmission rate according to the changed state of the network.

7. The method of claim 6, wherein whether the state of the network changes is determined by comparing the current transmission rate with the threshold transmission rate.

8. The method of claim 7, wherein it is determined that the state of the network changes, when the current transmission rate is maintained as being greater than the threshold transmission rate for a predetermined time or when the current transmission rate is maintained as being less than the threshold transmission rate for the predetermined time,
   wherein, in response to the current transmission rate being maintained at greater than the threshold transmission rate for the predetermined time, further comprising:
   determining the maximum transmission rate, determining the threshold transmission rate based on the determined maximum transmission rate, and adjusting the congestion window size,
   wherein, in response to the current transmission rate being maintained at less than the threshold transmission rate for the predetermined time, further comprising:
   resetting the threshold transmission rate to a current transmission rate that is maintained as being less than the threshold transmission rate for the predetermined time.

9. The method of claim 1, further comprising:
   receiving information of a reception congestion window size determined by a receiver; and determining a final congestion window size using the received information of the reception congestion window size and the adjusted congestion window size.

10. An apparatus for controlling transmission control protocol (TCP) congestion in a communication system, the apparatus comprising:
   a transmission rate controller configured to determine a maximum transmission rate of a network while increasing a congestion window size every predetermined time unit and to determine a threshold transmission rate such that a ratio of the threshold transmission rate to the determined maximum transmission rate is set to a predetermined value; and
   a window controller configured to adjust the congestion window size such that a current transmission rate is greater than or equal to the threshold transmission rate and a delay time is less than or equal to a maximum allowable delay time,
   wherein the delay time is based on a round trip time (RTT) for a packet, and
   wherein the maximum transmission rate is determined to be a greater value between a transmission rate at a current point in time and a transmission rate until a previous point in time.

11. The apparatus of claim 10, wherein the threshold transmission rate is set considering the delay time.

12. The apparatus of claim 10, wherein the window controller is configured to increase the congestion window size from a previous congestion window size, if a value <E(i)+intE(i)> is positive and reduce the congestion window size from the previous congestion window size, if the value <E(i)+intE(i)> is not positive,
   wherein E(i) is 1−(current transmission rate/threshold transmission rate) at a point in time i,
   wherein intE(i) is an integral value of E(i) or (1−λ)*intE(i−1)+λ*E(i), and
   wherein λ is a moving average weight value,
   wherein a rate for increasing the congestion window size when the value <E(i)+intE(i)> is positive is set greater than a rate for reducing the congestion window size when the value <E(i) +intE(i)> is not positive.

13. The apparatus of claim 10, the window controller is configured to increase the congestion window size from a previous congestion window size, if E(i) is positive and reduce the congestion window size from the previous congestion window size, if E(i) is not positive,
   wherein E(i) is 1−(current transmission rate/threshold transmission rate) at a point in time i.

14. The apparatus of claim 13, wherein a rate for increasing the congestion window size when E(i) is positive is set greater than a rate for reducing the congestion window size when E(i) is not positive.

15. The apparatus of claim 10, if a state of a network changes, the transmission rate controller is configured to determine at least one of the maximum transmission rate and the threshold transmission rate according to the changed state of the network.

16. The apparatus of claim 15, wherein whether the state of the network changes is determined by comparing the current transmission rate with the threshold transmission rate.

17. The apparatus of claim 16, wherein it is determined that the state of the network changes if the current transmission rate is maintained as being greater than the threshold transmission rate for a predetermined time or if the current transmission rate is maintained as being less than the threshold transmission rate for the predetermined time,
   wherein if the current transmission rate is maintained as being greater than the threshold transmission rate for the predetermined time, the transmission rate controller is configured to determine the maximum transmission rate and determine the threshold transmission rate based on the determined maximum transmission rate and the window controller is configured to adjust the congestion window size again, and
   wherein if the current transmission rate is maintained as being less than the threshold transmission rate for the predetermined time, the transmission rate controller is configured to reset the threshold transmission rate to the current transmission rate that is maintained as being less than the threshold transmission rate for the predetermined time.

18. The apparatus of claim 10, further comprising:
   a receiver configured to receive information of a reception congestion window size determined by second receiver,
   wherein the window controller is configured to determine a final congestion window size using the received information of the reception congestion window size and the adjusted congestion window size.

* * * * *